United States Patent [19]
Hall

[11] Patent Number: 6,047,558
[45] Date of Patent: Apr. 11, 2000

[54] REFRIGERATED AGITATOR ASSEMBLY

[75] Inventor: Michael Wayne Hall, Sidney, Ohio

[73] Assignee: Peerless Machinery Corporation, Sidney, Ohio

[21] Appl. No.: 09/154,359

[22] Filed: Sep. 16, 1998

Related U.S. Application Data

[60] Provisional application No. 60/059,282, Sep. 18, 1997.

[51] Int. Cl.⁷ ...................................................... A23G 9/12
[52] U.S. Cl. .............................................. 62/343; 366/147
[58] Field of Search .................. 62/342, 343; 165/109.1; 366/147

[56] References Cited

U.S. PATENT DOCUMENTS

| | | | |
|---|---|---|---|
| 1,962,803 | 6/1934 | Bruins | 366/147 |
| 2,205,431 | 6/1940 | Olson, Jr. | 366/147 |
| 3,762,947 | 10/1973 | Ornstein et al. | 366/147 |
| 3,788,392 | 1/1974 | Abbott et al. | 366/147 |
| 4,143,975 | 3/1979 | Lodige et al. | 366/147 |
| 4,275,568 | 6/1981 | Zielsdorf | 62/342 |
| 4,888,111 | 12/1989 | Diemer | 366/147 |

*Primary Examiner*—William E. Tapolcai
*Attorney, Agent, or Firm*—Killworth, Gottman, Hagan & Schaeff, LLP

[57] ABSTRACT

A refrigerated agitator assembly is provided including a rotatable agitator shaft, first and second split hub assemblies, and a plurality of agitator tubes. The rotatable agitator shaft defines a fluid supply passage, a fluid supply port, and a fluid return port. The first split hub assembly is secured proximate a first end of the agitator shaft so as to be rotatable with the agitator shaft. The first split hub assembly defines a supply hub duct coupled to the fluid supply port and a return hub duct coupled to the fluid return port. The second split hub assembly is secured proximate a second end of the agitator shaft so as to be rotatable with the agitator shaft and defines a transfer hub duct. A first agitator tube is secured to the first and second split hub assemblies and extends from the supply hub duct of the first split hub assembly to the transfer hub duct of the second split hub assembly. A second agitator tube is secured to the first and second split hub assemblies and extends from the transfer hub duct of the second split hub assembly to the return hub duct of the first split hub assembly.

19 Claims, 7 Drawing Sheets

REFRIGERATED AGITATOR ASSEMBLY

CROSS REFERENCE TO RELATED APPLICATIONS

This application claims the benefit of U.S. Provisional Application Ser. No. 60/059,282, for REFRIGERATED DOUGH MIXER, filed Sep. 18,1997.

BACKGROUND OF THE INVENTION

The present invention relates to a refrigerated agitator assembly and, more particularly, to a refrigerated agitator assembly for a dough mixer.

Friction and viscous shear encountered during mixing cause a temperature rise in a substance being mixed. This temperature rise becomes more severe as mixing speed increases and can adversely affect a mixing process. Accordingly, mixers, particularly dough mixers, are most effective when equipped with some type of temperature control means, whereby the temperature of the substance to be mixed may be stabilized at a preselected level or maintained below a predetermined threshold. For example, bread dough should be mixed at a temperature of about 78° F. to 80° F.

U.S. Pat. No. 4,275,568, issued to Zielsdorf on Jun. 30, 1981, teaches a temperature controlled dough mixer including a mixing bowl provided with a cooled sheet panel, a pair of cooled end panels, and a cooled breaker tube extending between the end panels. A cooled agitator may be rotatably mounted between the end panels of the mixing bowl. Unfortunately, the specific design taught in the Zielsdorf patent is relatively difficult and expensive to manufacture and maintain and is not compatible with many existing mixing schemes. The Zielsdorf patent is representative of the continuing need in the art of substance mixing for a mixer and refrigerated agitator assembly that may be manufactured and maintained in a cost effective manner, is compatible with existing mixing schemes, and that provides sufficient cooling during mixing operations.

BRIEF SUMMARY OF THE INVENTION

This need is met by the present invention wherein a refrigerated mixer and agitator assembly are provided including a rotatable agitator shaft defining a fluid supply passage, a fluid supply port, and a fluid return port. A pair of split hub assemblies are secured to opposite ends of the agitator shaft and define hub ducts therein for passing cooling fluid.

In accordance with one embodiment of the present invention, a refrigerated agitator assembly is provided comprising a rotatable agitator shaft, first and second hub assemblies, and a plurality of agitator tubes. The rotatable agitator shaft defines a fluid supply passage, a fluid supply port, and a fluid return port. The first hub assembly is secured proximate a first end of the agitator shaft so as to be rotatable with the agitator shaft. The first hub assembly defines a supply hub duct coupled to the fluid supply port and a return hub duct coupled to the fluid return port. The second hub assembly is secured proximate a second end of the agitator shaft so as to be rotatable with the agitator shaft and defines a transfer hub duct. A first agitator tube is secured to the first and second hub assemblies and extends from the supply hub duct of the first hub assembly to the transfer hub duct of the second hub assembly. A second agitator tube is secured to the first and second hub assemblies and extends from the transfer hub duct of the second hub assembly to the return hub duct of the first hub assembly.

The first hub assembly preferably comprises a first split hub assembly including a first set of complementary hub portions secured to one another about the agitator shaft. Similarly, the second hub assembly preferably comprises a second split hub assembly including a set of complementary hub portions secured to one another about the agitator shaft. The first set of complementary hub portions and the second set of complementary hub portions may be secured together with respective sets of hub securing hardware. The first agitator tube may be mechanically coupled to a first one of the first set of complementary hub portions and to a first one of the second set of complementary hub portions to form a first split hub unit. Similarly, the second agitator tube may be mechanically coupled to a second one of the first set of complementary hub portions and a second one of the second set of complementary hub portions to form a second split hub unit. Preferably, the first split hub unit is securable to and detachable from the second split hub unit by engaging and disengaging respective sets of hub securing hardware.

The fluid supply port and the fluid return port may be at the same end of the agitator shaft. The fluid supply passage is preferably divided into fluid inlet passage and a fluid outlet passage. The fluid inlet passage may extend between a fluid supply and the fluid supply port. The fluid outlet passage may extend between the fluid return port and the fluid supply. The fluid supply passage may be divided by a supply passage conduit oriented about a central axis of the rotatable agitator shaft. The fluid supply passage may be coupled to the fluid supply via a rotary union and the rotary union may be arranged to define respective portions of the fluid inlet passage and the fluid outlet passage. The rotary union may comprise a stationary rotary union body defining a rotary union fluid inlet and a rotary union fluid outlet, a rotatable rotary union shaft, a rotary union pipe, and a rotary union end cap.

The agitator shaft preferably comprises a shaft body having first and second ends defining a longitudinal shaft axis and a substantially cylindrical shaft periphery and the fluid supply passage is formed in the agitator shaft along a portion of the longitudinal shaft axis. The fluid supply port and the fluid return port may be formed in the shaft periphery so as to be in fluid communication with the fluid supply passage. The agitator shaft may further define a fluid transmission duct formed in the agitator shaft at an opposite end of the shaft from the fluid supply passage, the fluid supply port, and the fluid return port. The fluid transmission duct preferably comprises a transverse bore formed in the agitator shaft.

The refrigerated agitator assembly preferably further comprises a third agitator tube secured to the first and second hub assemblies and extending from the supply hub duct of the first hub assembly to the transfer hub duct of the second hub assembly. Alternatively, the third agitator tube may extend from the transfer hub duct of the second hub assembly to the return hub duct of the first hub assembly. The agitator tubes preferably extend substantially parallel to the agitator shaft. The refrigerated agitator assembly further preferably comprises respective roller bars spaced from and oriented substantially parallel to each agitator tube.

In accordance with another embodiment of the present invention, a refrigerated agitator assembly is provided comprising a rotatable agitator shaft, first and second split hub assemblies, and a plurality of agitator tubes. The rotatable agitator shaft comprises first and second ends and defines a fluid supply passage, a fluid supply port, and a fluid return port. The first split hub assembly is secured proximate the first end of the agitator shaft so as to be rotatable with the agitator shaft and defines a supply hub duct coupled to the fluid supply port. Further, the first split hub assembly comprises a first set of complementary hub portions secured to one another about the agitator shaft. The second split hub assembly is secured proximate the second end of the agitator shaft so as to be rotatable with the agitator shaft and defines a transfer hub duct. The second split hub assembly comprises a second set of complementary hub portions secured to one another about the agitator shaft. A first agitator tube is secured to the first and second hub assemblies and extends between the supply hub duct of the first hub assembly and the transfer hub duct of the second hub assembly. A second agitator tube is secured to the first and second hub assemblies and extends between the supply hub duct of the first hub assembly and the transfer hub duct of the second hub assembly.

Preferably, the first split hub additionally defines a return hub duct coupled to the fluid return port. The transfer hub duct may extends between the first agitator tube and the second agitator tube. The fluid supply port and the fluid return port may be at the same end of the agitator shaft.

The respective sets of complementary hub portions are preferably secured together with respective sets of hub securing hardware. The first agitator tube may be mechanically coupled to a first one of the first set of complementary hub portions and a first one of the second set of complementary hub portions to form a first split hub unit. The second agitator tube may be mechanically coupled to a second one of the first set of complementary hub portions and a second one of the second set of complementary hub portions to form a second split hub unit. In this manner, the first split hub unit is securable to and detachable from the second split hub unit by engaging and disengaging the hub securing hardware.

In accordance with yet another embodiment of the present invention, an agitator shaft is provided comprising a shaft body, a fluid supply passage, a fluid supply port, and a fluid return port. The shaft body has first and second ends defining a longitudinal shaft axis and a substantially cylindrical shaft periphery. The fluid supply passage is formed in the agitator shaft along a portion of the longitudinal shaft axis. The fluid supply port is formed in the shaft periphery so as to be in fluid communication with the fluid supply passage. Similarly, the fluid return port is formed in the shaft periphery so as to be in fluid communication with the fluid supply passage.

The agitator shaft may further define a fluid transmission duct formed in the agitator shaft at an opposite end of the shaft from the fluid supply passage, the fluid supply port, and the fluid return port. The fluid transmission duct may comprise a transverse bore formed in the agitator shaft.

In accordance with yet another embodiment of the present invention, a refrigerated mixer is provided comprising a mixing bowl and a refrigerated agitator assembly according to the present invention positioned to rotate within the mixing bowl Accordingly, it is an object of the present invention to provide a refrigerated agitator assembly and a refrigerated mixer incorporating the same, wherein the arrangement of the refrigerated agitator assembly provides for substantial temperature stabilization within the mixer. It is a further object of the present invention to provide such an agitator assembly in a manner to ensure that the assembly may be manufactured and maintained at a reasonable expense. Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

Figure 1:
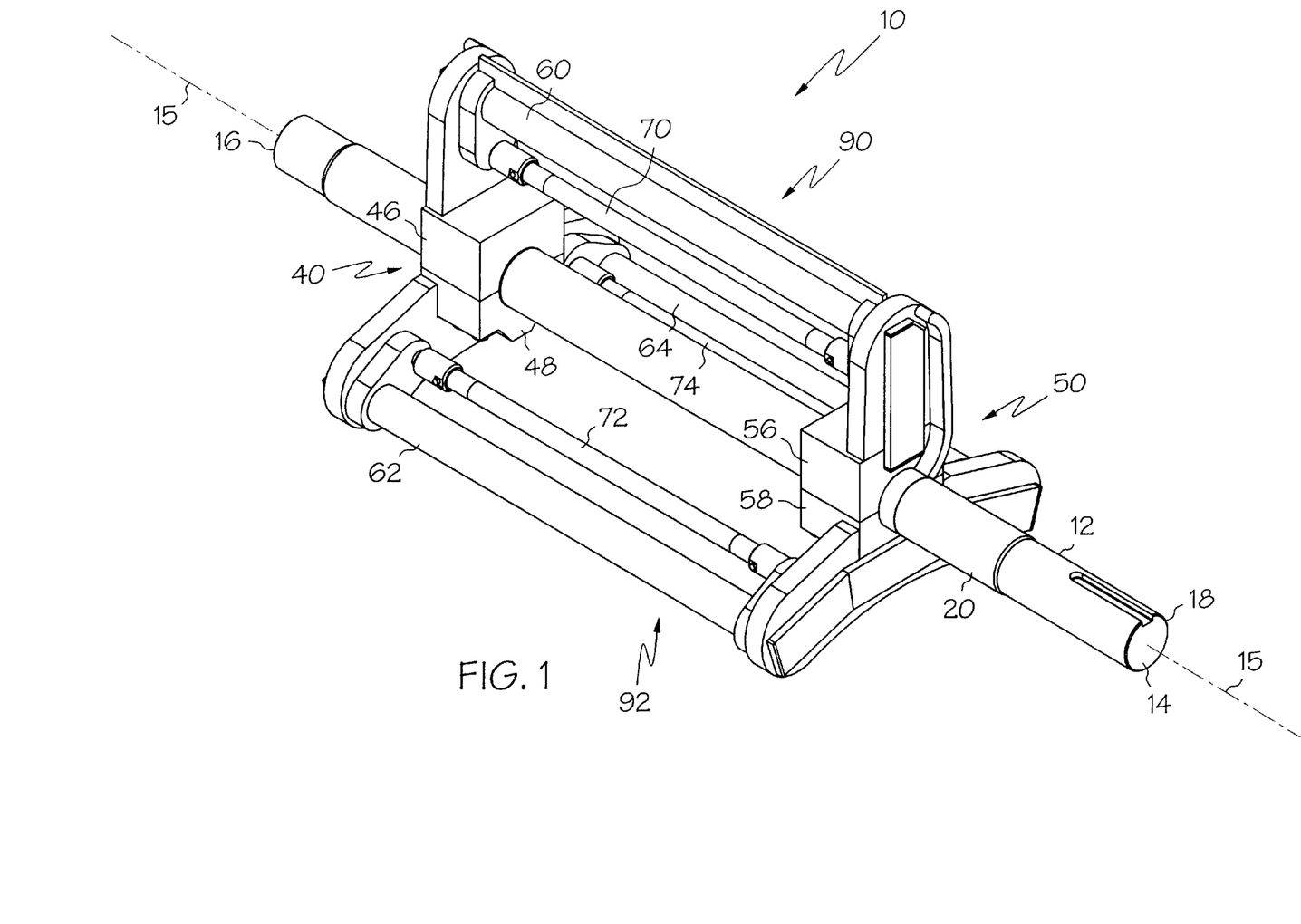
FIG. 1 is an isometric illustration of a refrigerated agitator assembly according to the present invention.
Figure 2:
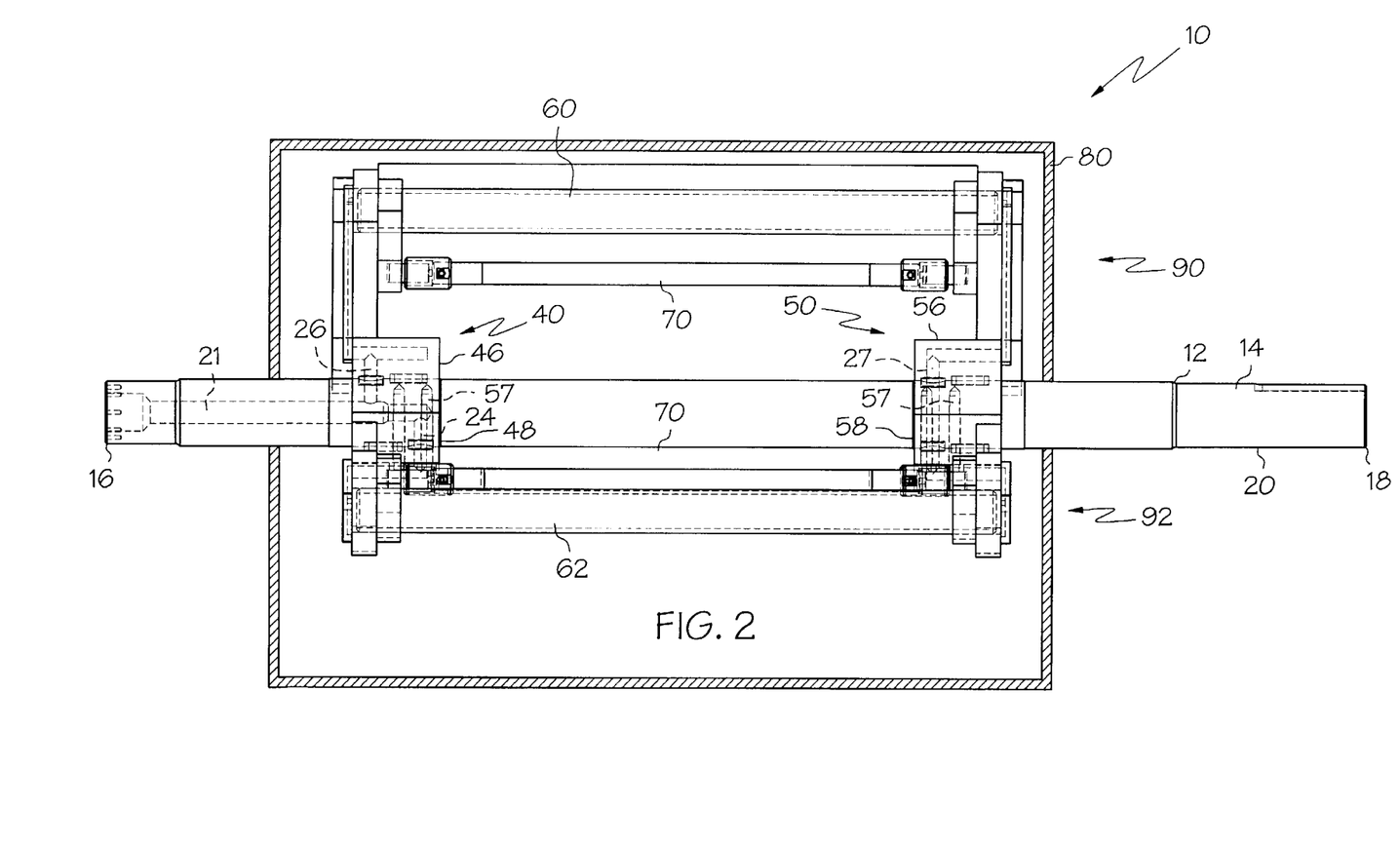
FIG. 2 is a plan view of the refrigerated agitator assembly illustrated in FIG. 1.

A refrigerated agitator assembly 10 according to the present invention is illustrated in FIGS. 1 and 2. The remaining figures include illustrations of specific components of an agitator assembly 10 according to the present invention. The refrigerated agitator assembly 10 comprises a rotatable agitator shaft 12, a first split hub assembly 40, a second split hub assembly 50, first, second, and third agitator tubes 60, 62, 64 extending substantially parallel to the agitator shaft 12, and respective roller bars 70, 72, 74 associated with each agitator tube 60, 62, 64. The agitator assembly 10 is arranged relative to a mixing bowl 80, see FIG. 2, such that the agitator tubes 60, 62, 64 are positioned within the mixing bowl 80.

Figure 3:
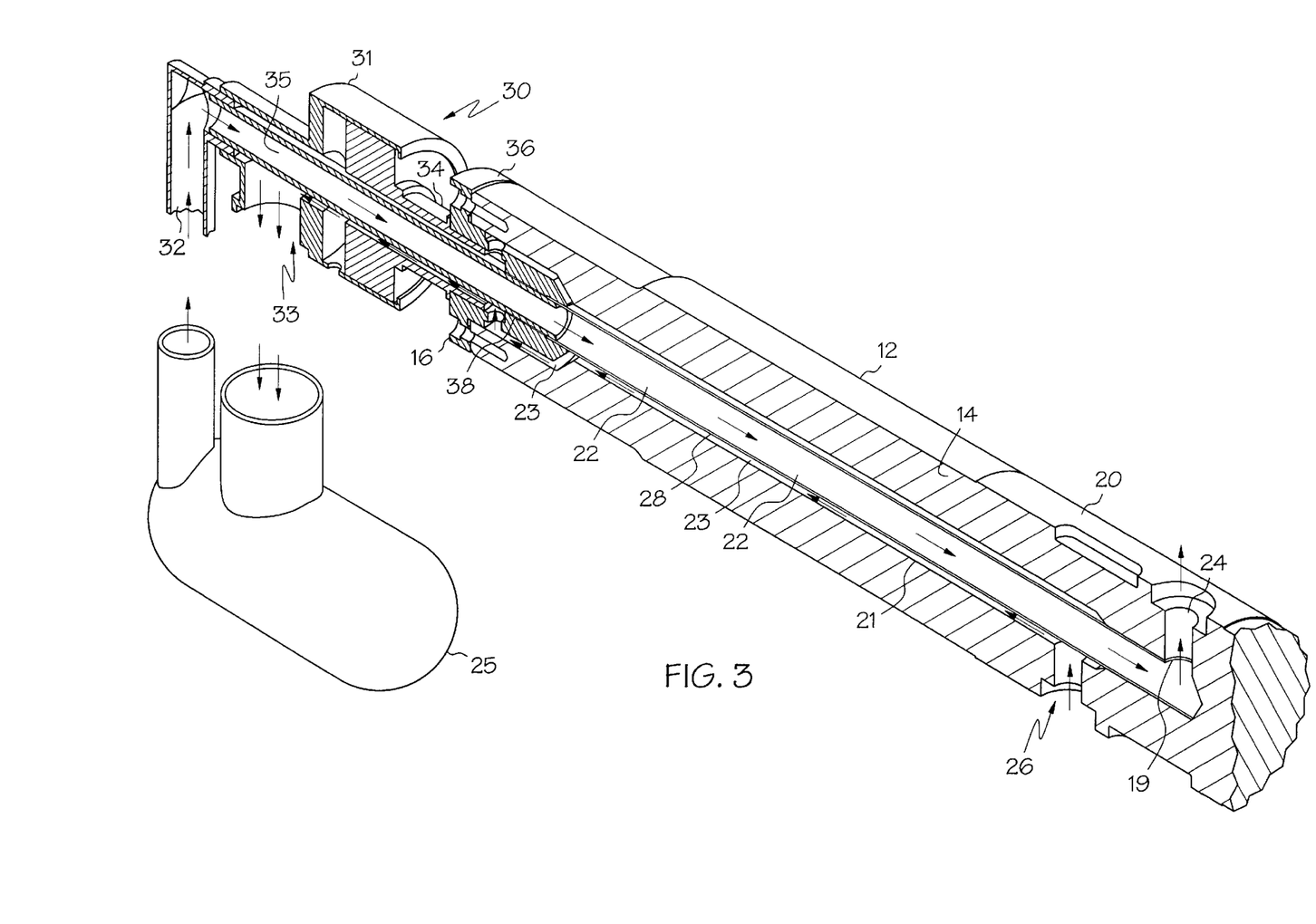
FIG. 3 is an isometric view, in cross-section, of an agitator shaft, rotary union, and supply passage conduit assembly according to the present invention.
Figure 7:
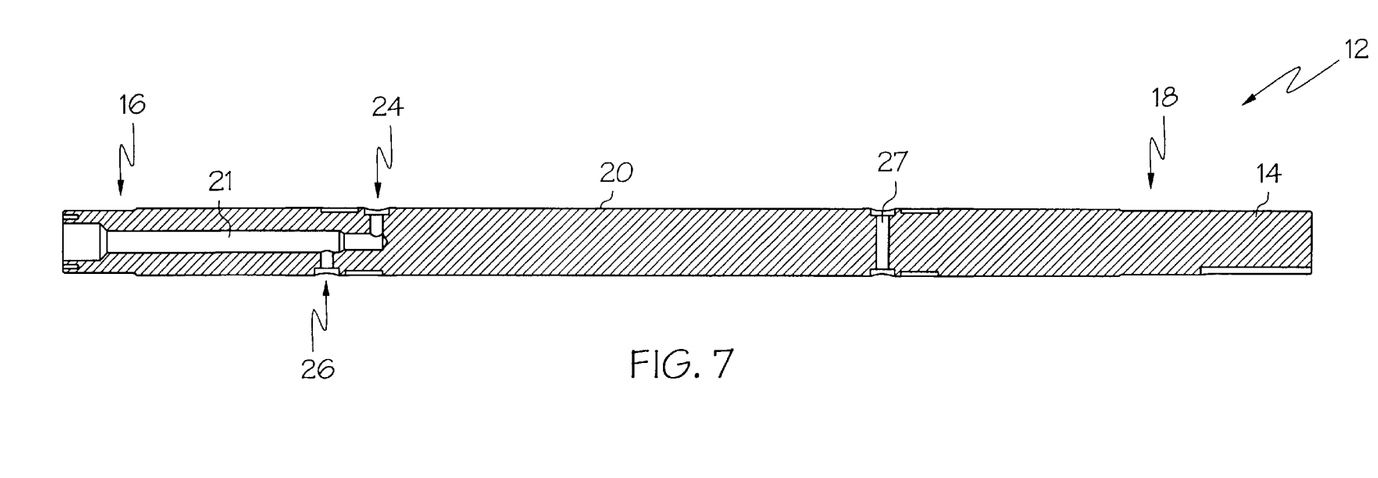
FIG. 7 is a cross-sectional illustration of an agitator shaft according to the present invention.

Referring to FIGS. 2, 3, and 7, the rotatable agitator shaft 12 defines a fluid supply passage 21, a fluid supply port 24, and a fluid return port 26. The fluid supply passage 21 is divided into a fluid inlet passage 22 and a fluid outlet passage 23 by a supply passage conduit 28, see FIG. 3, oriented about a central longitudinal shaft axis 15 of the rotatable agitator shaft 12. The fluid inlet passage 22 extends between the fluid supply port 24 and a fluid supply 25 via a conduit aperture 19 formed in the supply passage conduit 28. The fluid supply is illustrated schematically in FIG. 3 and preferably comprises a reservoir of glycol or another suitable coolant. The fluid outlet passage 23 extends between the fluid return port 26 and the fluid supply 25.

Referring now to FIGS. 2, 3 and 7, the rotatable agitator shaft 12 of the present invention comprises a shaft body 14 having first and second ends 16, 18 defining a longitudinal shaft axis 15 and a substantially cylindrical shaft periphery 20. The fluid supply passage 21 is formed in the agitator shaft 12 proximate the first end 16 of the agitator shaft 12. The fluid supply passage 21 extends along the longitudinal shaft axis 15 far enough to place the fluid supply port 24 formed in the shaft periphery 20 in fluid communication with the fluid supply passage 21. The fluid return port 26 is also in fluid communication with the fluid supply passage 21.

Figure 4:
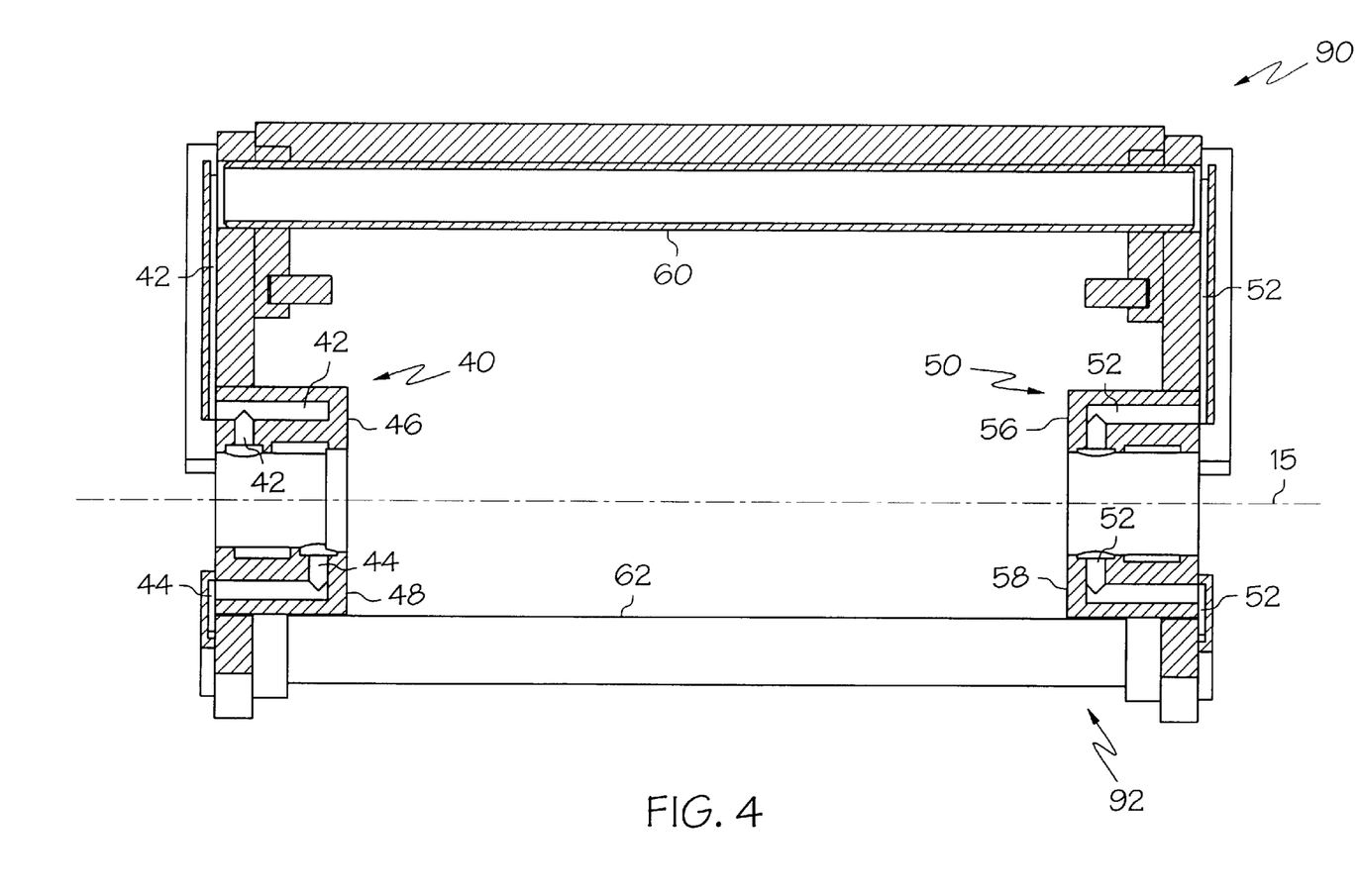
FIG. 4 is a cross-sectional partial plan view of an agitator assembly of the present invention.
Figure 5:
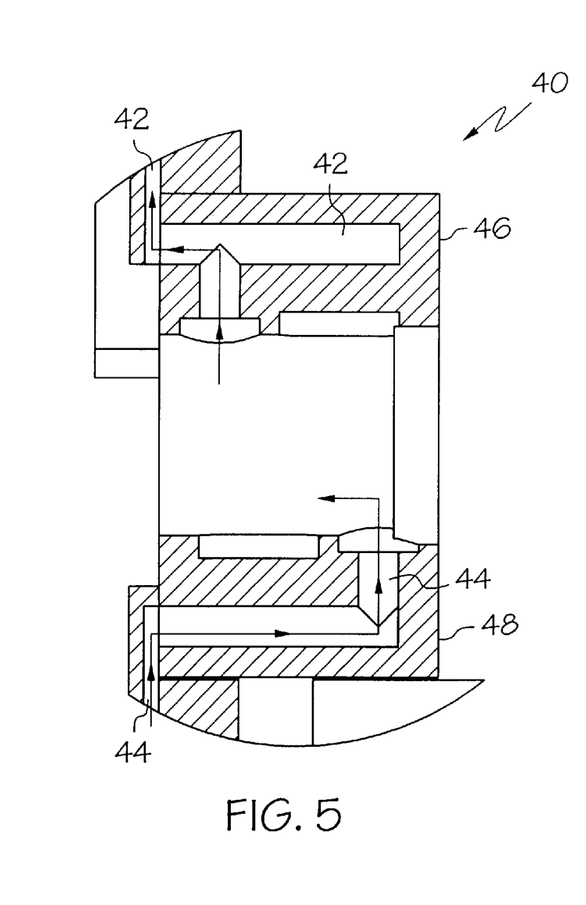
FIG. 5 is a detailed illustration of a portion of the agitator assembly illustrated in FIG. 4.
Figure 6:
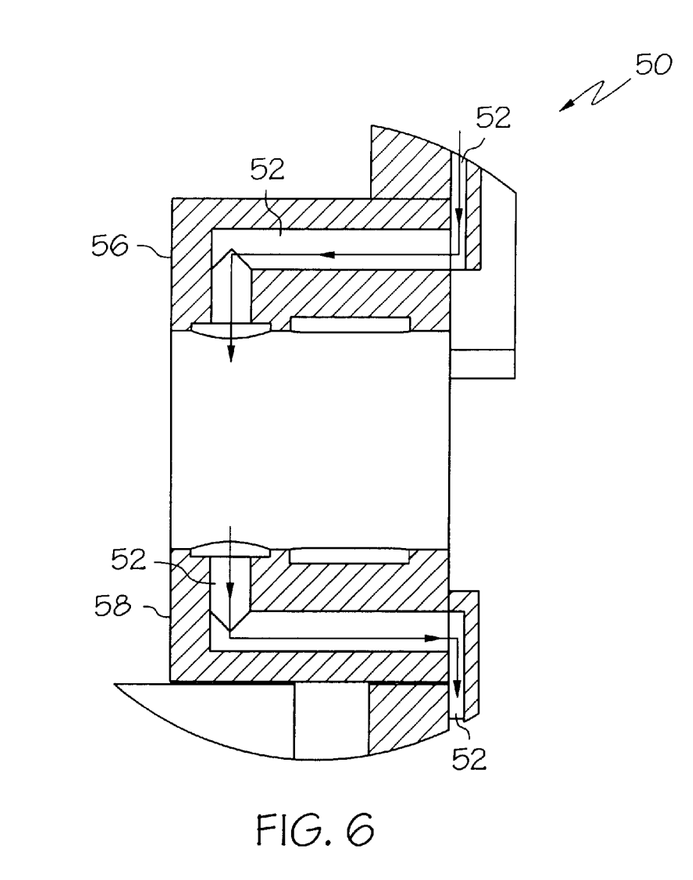
FIG. 6 is a detailed illustration of an additional portion of the agitator assembly illustrated in FIG. 4.

The agitator shaft 12 further defines a fluid transmission duct 27 formed in the agitator shaft 12 at an opposite end of the shaft from the fluid supply passage 21, the fluid supply port 24, and the fluid return port 26. The fluid transmission duct 27 comprises a transverse bore formed in the agitator shaft 12 and is positioned so as to be in fluid communication with the transfer hub duct 52 (see FIGS. 2, 4, and 5).

As is illustrated in FIG. 3, the fluid supply passage 21 is coupled to the fluid supply 25 via a rotary union 30. The rotary union 30 defines a portion of the fluid inlet passage 22 and the fluid outlet passage 23. The rotary union 30 comprises a stationary rotary union body 31 defining a rotary union fluid inlet 32 and a rotary union fluid outlet 33. The rotary union fluid inlet 32 and the rotary union fluid outlet 33 are each coupled to the fluid supply 25.

The rotary union 30 further comprises a rotatable rotary union shaft 34, a rotary union pipe 35, and a rotary union end cap 36. The rotary union pipe 35 engages the supply passage conduit 28 and a rotary union bushing 38 is provided to seal the engagement. In this manner, the fluid inlet passage 22 is defined within the interior of the supply passage conduit 28 and the rotary union pipe 35. Further, the fluid outlet passage 23 is defined about the exterior of the supply passage conduit 28 and the rotary union pipe 35. The supply passage conduit 28 is pressure fit within the tapered end of the fluid supply passage 21.

Figure 8:
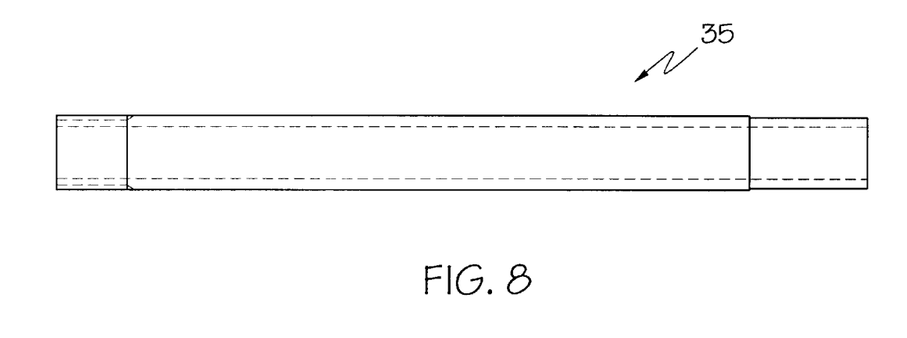
FIG. 8 is an illustration of a rotary union pipe according to the present invention.
Figure 9:
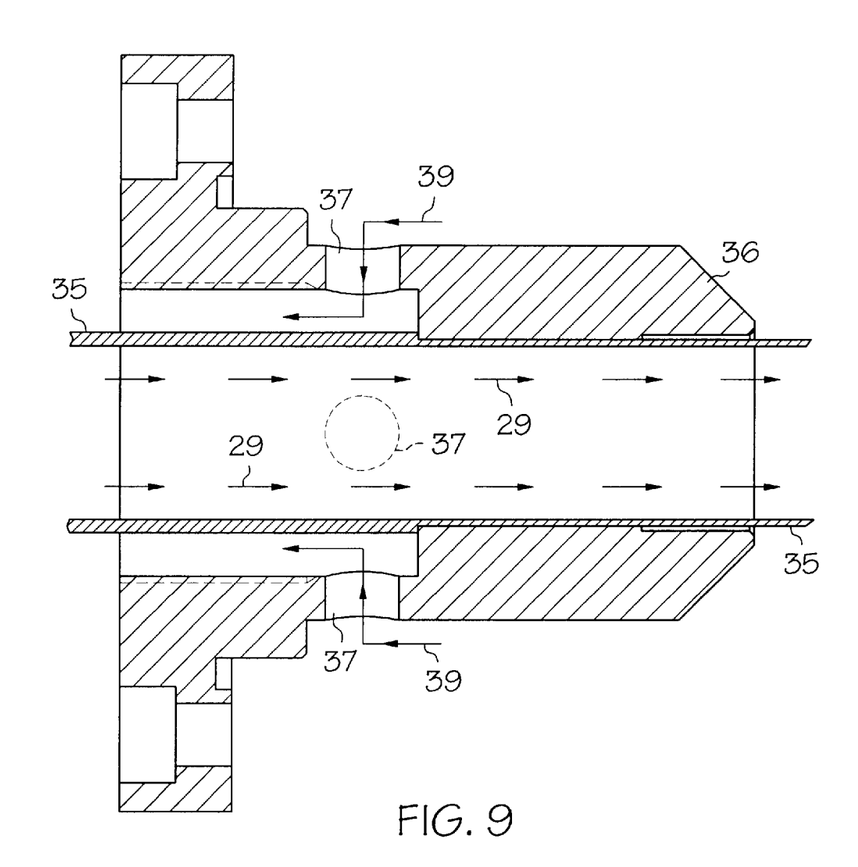
FIG. 9 is a cross-sectional illustration of a rotating union mounting cap and rotary union pipe according to the present invention.

The rotary union end cap 36, illustrated in detail in FIGS. 3 and 9, incorporates a number of fluid passing apertures 37 (see FIG. 9) to allow fluid traveling through the fluid outlet passage 23 to pass substantially unimpeded through the rotary union end cap 36, as indicated by directional arrows 39. The flow of fluid through the interior of the rotary union pipe 35 is indicated by directional arrow 29. Merely a portion of the rotary union pipe 35 is illustrated in FIG. 9; however, a detailed illustration of the entire rotary union pipe 35 is presented in FIGS. 3 and 8.

Referring now to FIGS. 1, 2, and 4–6, the first split hub assembly 40 is secured proximate a first end 16 of the agitator shaft 12 so as to be rotatable with the agitator shaft 12. The first split hub assembly 40 defines a supply hub duct 42 coupled to the fluid supply port 24 and a return hub duct 44 coupled to the fluid return port 26. Similarly, the second split hub assembly 50 is secured proximate a second end 18 of the agitator shaft 12 so as to be rotatable with the agitator shaft 12. The second split hub assembly 50 defines a transfer hub duct 52.

The first agitator tube 60 is secured to the first and second hub assemblies 40, 50 and extends from the supply hub duct 42 of the first split hub assembly 40 to the transfer hub duct 52 of the second split hub assembly 50. The second agitator tube 62 is also secured to the first and second hub assemblies 40, 50 and extends from the transfer hub duct 52 of the second split hub assembly 50 to the return hub duct 44 of the first split hub assembly 40. The third agitator tube 64 is also secured to the first and second hub assemblies 40, 50 and extends from the supply hub duct 42 of the first split hub assembly 40 to the transfer hub duct 52 of the second split hub assembly 50. It is contemplated by the present invention that the third agitator tube 64 may extend either from the supply hub duct 42 of the first split hub assembly 40 to the transfer hub duct 52 of the second split hub assembly 50 or from the transfer hub duct 52 of the second split hub assembly 50 to the return hub duct 44 of the first split hub assembly 40.

The above-described arrangement of the agitator assembly 10 enables cooling fluid to flow along a path beginning at the fluid supply 25, passing through the first end 16 of the agitator shaft 12 to the first split hub assembly 40, through the first and third agitator tubes 60 and 64 to the second split hub assembly 50 and the fluid transmission duct 27, through the second agitator tube 62, and returning to the fluid supply 25 via the first end of the agitator shaft 12. Thus, the fluid flow path begins and ends at the same end of the agitator shaft 12. Alternatively, it is contemplated by the present invention that the agitator assembly of the present invention may be arranged such that the fluid flow path may begin at one end of the agitator shaft 12 and terminate at an opposite end of the agitator shaft 12. As would be appreciated by those practicing the present invention, suitable sealing members should be provided at various locations within the agitator assembly 10, particularly where two distinct mechanical components including two distinct fluid passages or ducts engage and are in fluid communication with each other.

The first split hub assembly 40 is referred to herein as a "split" assembly because it includes a first set of complementary hub portions 46, 48 secured to one another about the agitator shaft 12. Similarly, the second split hub assembly 50 is referred to herein as a "split" assembly because it includes an additional set of complementary hub portions 56, 58 secured to one another about the agitator shaft 12. The first set of complementary hub portions 46, 48 are secured together with hub securing hardware 47 and the second set of complementary hub portions 56, 58 are secured together with hub securing hardware 57. The first and third agitator tubes 60, 64 are mechanically coupled to a first one 46 of the first set of complementary hub portions and a first one 56 of the second set of complementary hub portions to form a first split hub unit 90. Similarly, the second agitator tube 62 is mechanically coupled to a second one 48 of the first set of complementary hub portions and a second one 58 of the second set of complementary hub portions to form a second split hub unit 92. The first split hub unit 90 is securable to and detachable from the second split hub unit 92 by engaging and disengaging the hub securing hardware 47, 57. In this manner, the agitator assembly 10 of the present invention may be conveniently assembled, disassembled, and maintained.

Having described the invention in detail and by reference to preferred embodiments thereof, it will be apparent that modifications and variations are possible without departing from the scope of the invention defined in the appended claims.

What is claimed is:

1. A refrigerated agitator assembly comprising:
   a rotatable agitator shaft defining a fluid supply passage, a fluid supply port, and a fluid return port;
   a first hub assembly secured proximate a first end of said agitator shaft so as to be rotatable with said agitator shaft, wherein
     said first hub assembly defines a supply hub duct coupled to said fluid supply port and a return hub duct coupled to said fluid return port and
     said first hub assembly comprises a first split hub assembly including a first set of complementary hub portions secured to one another about said agitator shaft;
   a second hub assembly secured proximate a second end of said agitator shaft so as to be rotatable with said agitator shaft, wherein said second hub assembly defines a transfer hub duct and said second hub assembly comprises a second split hub assembly including a set of complementary hub portions secured to one another about said agitator shaft;

a first agitator tube secured to said first and second hub assemblies and extending from said supply hub duct of said first hub assembly to said transfer hub duct of said second hub assembly; and a second agitator tube secured to said first and second hub assemblies and extending from said transfer hub duct of said second hub assembly to said return hub duct of said first hub assembly.

2. A refrigerated agitator assembly as claimed in claim 1 wherein:

said first set of complementary hub portions are secured together with hub securing hardware;

said second set of complementary hub portions are secured together with hub securing hardware;

said first agitator tube is mechanically coupled to a first one of said first set of complementary hub portions and a first one of said second set of complementary hub portions to form a first split hub unit;

said second agitator tube is mechanically coupled to a second one of said first set of complementary hub portions and a second one of said second set of complementary hub portions to form a second split hub unit; and said first split hub unit is securable to and detachable from said second split hub unit by engaging and disengaging said hub securing hardware.

3. A refrigerated agitator assembly as claimed in claim 1 wherein said fluid supply port and said fluid return port are at the same end of said agitator shaft.

4. A refrigerated agitator assembly as claimed in claim 1 wherein:

said fluid supply passage is divided into fluid inlet passage and a fluid outlet passage;

said fluid inlet passage extends between a fluid supply and said fluid supply port; and said fluid outlet passage extends between said fluid return port and said fluid supply.

5. A refrigerated agitator assembly as claimed in claim 4 wherein said fluid supply passage is divided by a supply passage conduit oriented about a central axis of said rotatable agitator shaft.

6. A refrigerated agitator assembly as claimed in claim 4 wherein said fluid supply passage is coupled to said fluid supply via a rotary union and wherein said rotary union defines respective portions of said fluid inlet passage and said fluid outlet passage.

7. A refrigerated agitator assembly as claimed in claim 1 wherein said agitator shaft further defines a fluid transmission duct formed in said agitator shaft at an opposite end of said shaft from said fluid supply passage, said fluid supply port, and said fluid return port.

8. A refrigerated agitator assembly as claimed in claim 7 wherein said fluid transmission duct comprises a transverse bore formed in said agitator shaft.

9. A refrigerated agitator assembly as claimed in claim 1 wherein said refrigerated agitator assembly further comprises a third agitator tube secured to said first and second hub assemblies and extending from said supply hub duct of said first hub assembly to said transfer hub duct of said second hub assembly.

10. A refrigerated agitator assembly as claimed in claim 1 wherein said refrigerated agitator assembly further comprises a third agitator tube secured to said first and second hub assemblies and extending from said transfer hub duct of said second hub assembly to said return hub duct of said first hub assembly.

11. A refrigerated agitator assembly as claimed in claim 1 wherein said first and second agitator tubes extend substantially parallel to said agitator shaft.

12. A refrigerated agitator assembly as claimed in claim 6 wherein said rotary union comprises a stationary rotary union body defining a rotary union fluid inlet and a rotary union fluid outlet, a rotatable rotary union shaft, a rotary union pipe, and a rotary union end cap.

13. A refrigerated agitator assembly comprising:

a rotatable agitator shaft defining a fluid supply passage, a fluid supply port, and a fluid return port wherein said agitator shaft comprises a shaft body having first and second ends defining a longitudinal shaft axis and a substantially cylindrical shaft periphery, said fluid supply passage is formed in said agitator shaft along a portion of said longitudinal shaft axis, said fluid supply port is formed in said shaft periphery so as to be in fluid communication with said fluid supply passage, and said fluid return port is formed in said shaft periphery so as to be in fluid communication with said fluid supply passage;

a first hub assembly secured proximate a first end of said agitator shaft so as to be rotatable with said agitator shaft, said first hub assembly defining a supply hub duct coupled to said fluid supply port and a return hub duct coupled to said fluid return port;

a second hub assembly secured proximate a second end of said agitator shaft so as to be rotatable with said agitator shaft, said second hub assembly defining a transfer hub duct;

a first agitator tube secured to said first and second hub assemblies and extending from said supply hub duct of said first hub assembly to said transfer hub duct of said second hub assembly; and a second agitator tube secured to said first and second hub assemblies and extending from said transfer hub duct of said second hub assembly to said return hub duct of said first hub assembly.

14. A refrigerated agitator assembly comprising:

a rotatable agitator shaft defining a fluid supply passage, a fluid supply port, and a fluid return port;

a first hub assembly secured proximate a first end of said agitator shaft so as to be rotatable with said agitator shaft, said first hub assembly defining a supply hub duct coupled to said fluid supply port and a return hub duct coupled to said fluid return port;

a second hub assembly secured proximate a second end of said agitator shaft so as to be rotatable with said agitator shaft, said second hub assembly defining a transfer hub duct;

a first agitator tube secured to said first and second hub assemblies and extending from said supply hub duct of said first hub assembly to said transfer hub duct of said second hub assembly;

a second agitator tube secured to said first and second hub assemblies and extending from said transfer hub duct of said second hub assembly to said return hub duct of said first hub assembly; and respective roller bars spaced from and oriented substantially parallel to each agitator tube.

15. A refrigerated agitator assembly comprising:

a rotatable agitator shaft comprising first and second ends and defining a fluid supply passage, a fluid supply port, and a fluid return port;

a first split hub assembly secured proximate said first end of said agitator shaft so as to be rotatable with said agitator shaft, wherein said first split hub assembly defines a supply hub duct coupled to said fluid supply port and said first split hub assembly comprises a first set of complementary hub portions secured to one another about said agitator shaft;

a second split hub assembly secured proximate said second end of said agitator shaft so as to be rotatable with said agitator shaft, wherein said second split hub assembly defines a transfer hub duct and said second split hub assembly comprises a second set of complementary hub portions secured to one another about said agitator shaft;

a first agitator tube secured to said first and second hub assemblies and extending between said supply hub duct of said first hub assembly and said transfer hub duct of said second hub assembly; and a second agitator tube secured to said first and second hub assemblies and extending between said supply hub duct of said first hub assembly and said transfer hub duct of said second hub assembly.

16. A refrigerated agitator assembly as claimed in claim 15 wherein said first split hub additionally defines a return hub duct coupled to said fluid return port.

17. A refrigerated agitator assembly as claimed in claim 15 wherein said transfer hub duct extends between said first agitator tube and said second agitator tube.

18. A refrigerated agitator assembly as claimed in claim 17 wherein said fluid supply port and said fluid return port are at the same end of said agitator shaft.

19. A refrigerated agitator assembly as claimed in claim 15 wherein said first set of complementary hub portions are secured together with hub securing hardware;

said second set of complementary hub portions are secured together with hub securing hardware;

said first agitator tube is mechanically coupled to a first one of said first set of complementary hub portions and a first one of said second set of complementary hub portions to form a first split hub unit;

said second agitator tube is mechanically coupled to a second one of said first set of complementary hub portions and a second one of said second set of complementary hub portions to form a second split hub unit; and said first split hub unit is securable to and detachable from said second split hub unit by engaging and disengaging said hub securing hardware.

* * * * *